United States Patent [19]
Chapman et al.

[11] Patent Number: 5,317,799
[45] Date of Patent: Jun. 7, 1994

[54] METHOD OF MAKING HOSE COUPLING WITH FERRULE END BENT OVER INSERT

[75] Inventors: Charles L. Chapman, Strafford; Randy C. Foster, Springfield, both of Mo.

[73] Assignee: Dayco Products, Inc., Dayton, Ohio

[21] Appl. No.: 61,407

[22] Filed: May 13, 1993

Related U.S. Application Data

[63] Continuation of Ser. No. 721,793, Jun. 26, 1992, abandoned.

[51] Int. Cl.⁵ .................. F16L 25/00; B23P 11/02
[52] U.S. Cl. .................................. 29/508; 29/516; 285/256; 285/259
[58] Field of Search .............. 285/256, 259, 243; 29/507, 508, 516

[56] References Cited
U.S. PATENT DOCUMENTS

| | | | |
|---|---|---|---|
| 1,802,572 | 4/1931 | Phillips | 285/259 |
| 2,314,000 | 3/1943 | Lusher et al. | 285/256 |
| 4,212,487 | 7/1980 | Jones et al. | 285/259 |
| 4,498,691 | 2/1985 | Cooke | 285/256 |
| 5,112,087 | 5/1992 | Haruki | 285/101 |
| 5,140,738 | 8/1992 | Pinkerman, Jr. | 285/243 |
| 5,149,145 | 9/1992 | Yokomatsu et al. | 285/101 |

*Primary Examiner*—Eric K. Nicholson
*Attorney, Agent, or Firm*—Joseph V. Tassone

[57] ABSTRACT

A hose construction, hose coupling therefor and methods of making the same are provided, the hose construction comprising a combination of a hose coupling and a tubular hose having one end thereof clamped in an annular recess of the coupling, the coupling having a longitudinal axis and comprising a tubular insert portion inserted into the end of the hose and having an external peripheral surface that is substantially parallel to the longitudinal axis and a tubular ferrule portion disposed in substantially concentric and spaced relation about the insert portion to define the annular recess therebetween and being radially inwardly deformed toward the longitudinal axis so as to clamp the end of the hose between the ferrule portion and the insert portion, the ferrule portion having a plurality of inwardly directed and axially spaced apart annular ridges deformed into the end of the hose, the ferrule portion comprising an outer generally cylindrical section having an inner peripheral surface provided with opposed ends and a separate ridged section held within the outer section by the ends thereof to define a self-contained ferrule portion and having an outer peripheral surface disposed in engagement with the inner peripheral surface of the outer section and having an inner peripheral surface defining the ridges of the ferrule portion.

9 Claims, 5 Drawing Sheets

METHOD OF MAKING HOSE COUPLING WITH FERRULE END BENT OVER INSERT

CROSS REFERENCE TO RELATED APPLICATION

This application is a continuation patent application of its copending parent patent application, Ser. No. 721,793, filed Jun. 26, 1992, now abandoned.

BACKGROUND OF THE INVENTION

1. Field of the Invention

This invention relates to a new hose coupling and to of the hose coupling and a hose as well as to new methods of making the same.

2. Prior Art Statement

It is known to provide a combination of a hose coupling and a tubular hose having one end thereof clamped in an annular recess of the coupling, the coupling having a longitudinal axis and comprising a tubular insert portion inserted into the end of the hose and having an external peripheral surface that is substantially parallel to the longitudinal axis and a tubular ferrule portion disposed in substantially concentric and spaced relation about the insert portion to define the annular recess therebetween and being radially inwardly deformed toward the longitudinal axis so as to clamp the end of the hose between the ferrule portion and the insert portion, the ferrule portion having a plurality of inwardly directed and axially spaced apart annular ridges deformed into the end of the hose. For example, see the Foster U.S. Pat. No. 4,653,779.

It is also known to form the ferrule portion with an outer generally cylindrical section and separate inner ridged section respectively having surface means disposed in engagement with each other during the deforming of the ferrule portion toward the insert portion. For example, see the Lusher et al, U.S. Pat. No. 2,314,000, and the Jones U.S. Pat. No. 4,212,487.

SUMMARY OF THE INVENTION

It is one feature of this invention to provide a new coupling for attaching to the end of a tubular hose, the new coupling being formed of a plurality of parts so as to reduce the cost thereof as well as to permit the contour shape and/or material thereof to be easily varied for different applications.

In particular, it has been found that the prior known hose couplings require the inside surface of the outer ferrule portion to be machined in order to provide a plurality of inwardly directed and axially spaced apart annular ridges thereon for deforming into the end of the hose being coupled thereby.

However, it was found according to the teachings of this invention that the ferrule portion can be formed from an outer generally cylindrical section and a separate inner ridged section to be uniquely held within the outer section by the opposed end means thereof to define a self-contained ferrule portion with the outer and inner sections respectively having peripheral surface means disposed in engagement with each other to readily permit the resulting ferrule portion to be deformed toward the insert portion to clamp the end of the hose therebetween.

For example, one embodiment of this invention comprises a combination of a hose coupling and a tubular hose having one end thereof clamped in an annular recess of the coupling, the coupling having a longitudinal axis and comprising a tubular insert portion inserted into the end of the hose and having an external peripheral surface that is substantially parallel to the longitudinal axis and a tubular ferrule portion disposed in substantially concentric and spaced relation about the insert portion to define the annular recess therebetween and being radially inwardly deformed toward the longitudinal axis so as to clamp the end of the hose between the ferrule portion and the insert portion, the ferrule portion having a plurality of inwardly directed and axially spaced apart annular ridges deformed into the end of the hose, the tubular ferrule portion comprising an outer generally cylindrical section having an inner peripheral surface means provided with opposed end means and a separate ridged section held within the outer section by the end means thereof to define a self-contained ferrule portion and having an outer peripheral surface means disposed in engagement with the inner peripheral surface means of the outer section and having an inner peripheral surface means defining the ridges of the ferrule portion.

Accordingly, it is an object of this invention to provide a new combination of a hose coupling and a tubular hose having one end thereof clamped in an annular recess of the coupling, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Another object of this invention is to provide a new hose coupling having one or more of the novel features of this invention as set forth above or hereinafter shown or described.

Another object of this invention is to provide a new method of making such a hose coupling, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
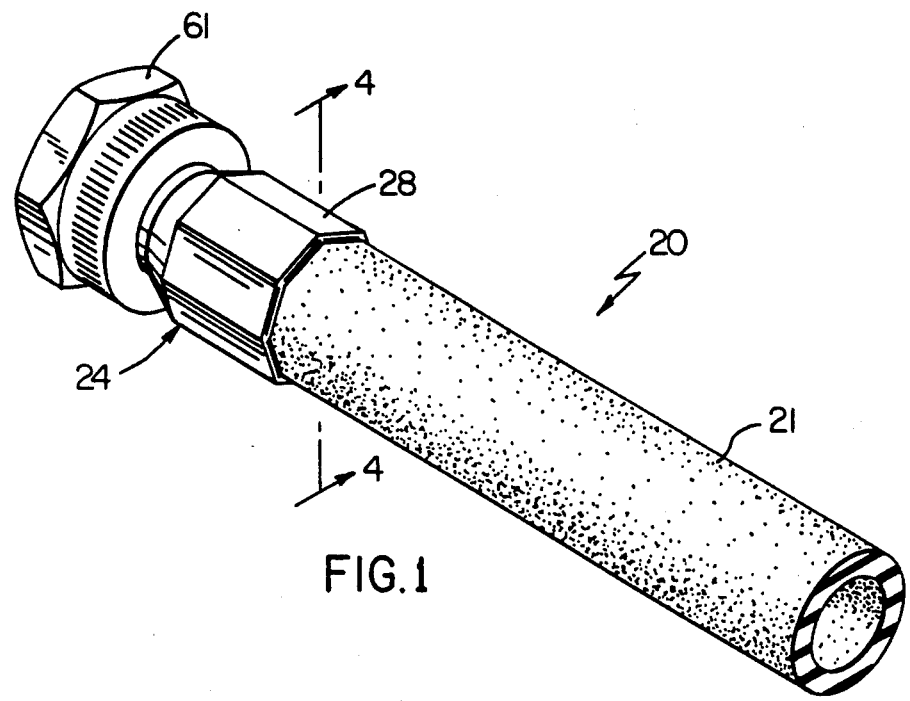
FIG. 1 is a fragmentary perspective view illustrating the new combination of this invention that comprises a hose coupling and a tubular hose having one end thereof clamped in an annular recess of the coupling.

While the various features of this invention are hereinafter illustrated and described as being particularly adapted to provide a hose coupling for a particular tubular hose, it is to be understood that the various features of this invention can be used singly or in various combinations thereof to provide a hose coupling for other types of tubular hoses as desired.

Therefore, this invention is not to be limited to only the embodiments illustrated in the drawings, because the drawings are merely utilized to illustrate one of the wide variety of uses of this invention.

Figure 4:
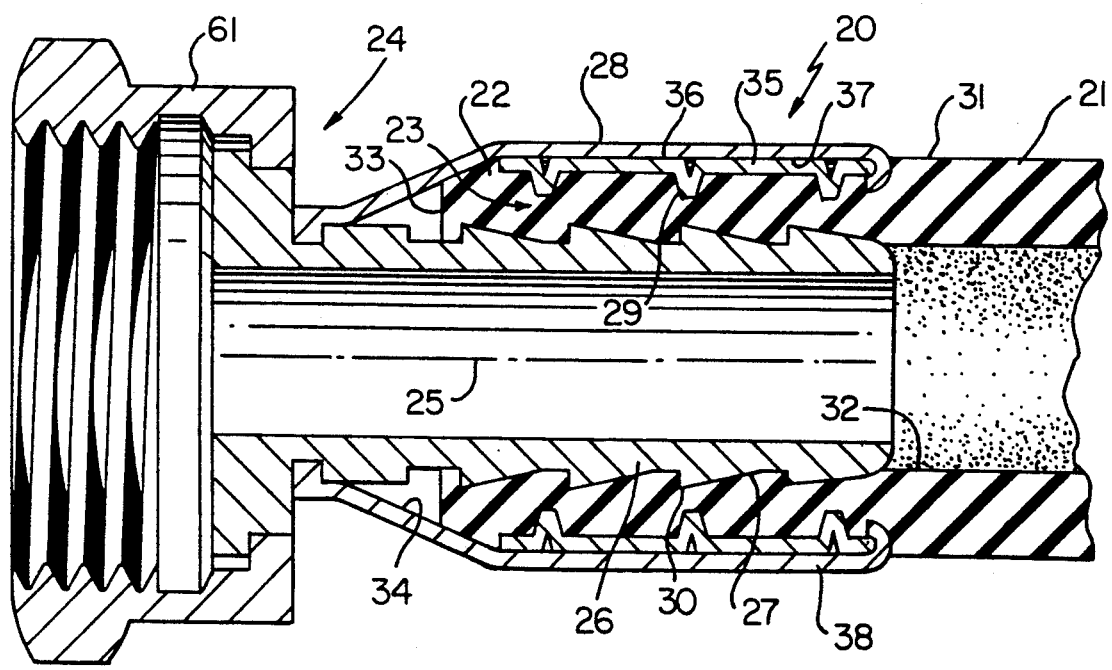
FIG. 4 is a view similar to FIG. 3 and is an enlarged fragmentary cross-sectional view taken on line 4—4 of FIG. 1, FIG. 4 illustrating how the hose coupling of this invention has been deformed in a manner to clamp the end of the hose in the recess of the coupling to form the combination illustrated in FIG. 1.

Referring now to FIGS. 1 and 4, the new hose construction or new combination of this invention is generally indicated by the reference numeral 20 and comprises a tubular hose 21 formed of any suitable deformable material, such as polymeric material, having one end 22 thereof clamped in an annular recess 23 of a hose coupling of this invention that is generally indicated by the reference numeral 24 and that is formed of any suitable material, such as metallic material.

The hose coupling 24 has a longitudinal axis 25, FIG. 4, and comprises a tubular insert portion 26 that has been inserted into the end 22 of the hose 21 and has an external peripheral surface 27 that is substantially parallel to the longitudinal axis 25 and a tubular ferrule portion 28 that is disposed in substantially concentric and spaced relation about the insert portion 26 to define the annular recess 23 therebetween and having been radially inwardly deformed toward the longitudinal axis 25 so as to clamp the end 22 of the hose 21 between the ferrule portion 28 and the insert portion 26. Such clamping operation by deforming the ferrule portion 28 toward the insert portion 26 is a method well known in the art. For example, see the aforementioned Foster et al, U.S. Pat. No. 4,653,779, whereby this U. S. patent is being incorporated into this disclosure by this reference thereto.

The ferrule portion 28 of the coupling 24 has a plurality of inwardly directed and axially spaced apart annular ridges 29 that are deformed into the end 22 of the hose 21 during the inward deforming of the ferrule portion 28 toward the insert portion 26. If desired, the insert portion 26 can likewise have a plurality of outwardly directed and axially spaced apart annular ridges or barbs 30 that are deformed into the end 22 of the hose 21 as illustrated.

Figure 2:
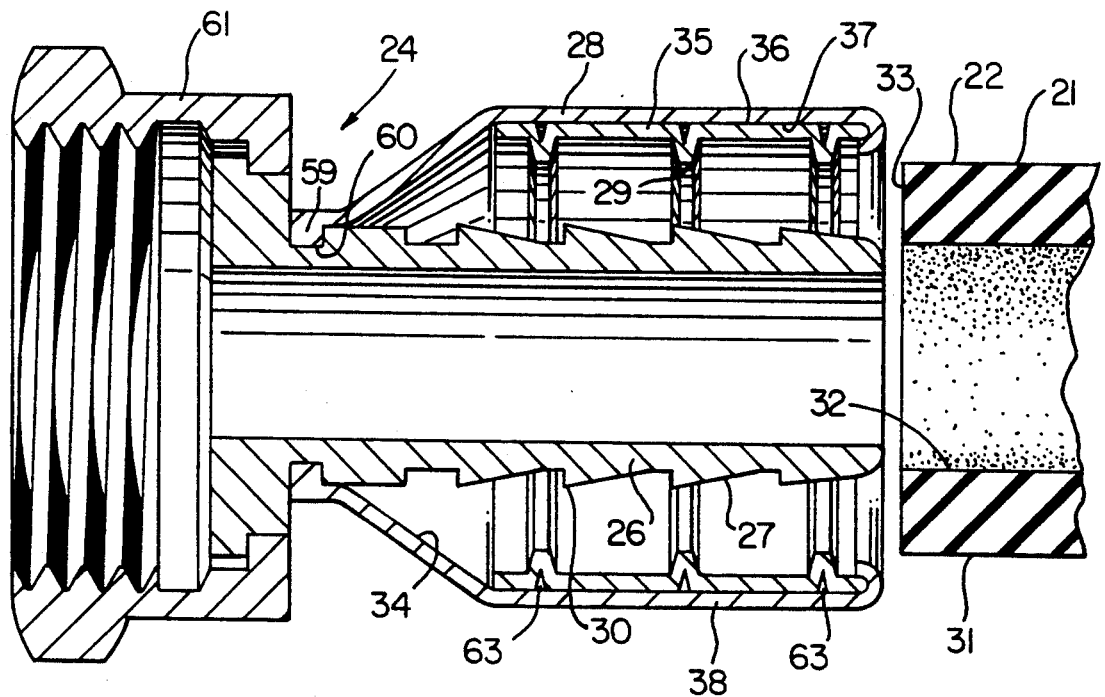
FIG. 2 is an enlarged fragmentary cross-sectional view illustrating the new hose coupling of this invention before the end of the hose is inserted therein.
Figure 3:
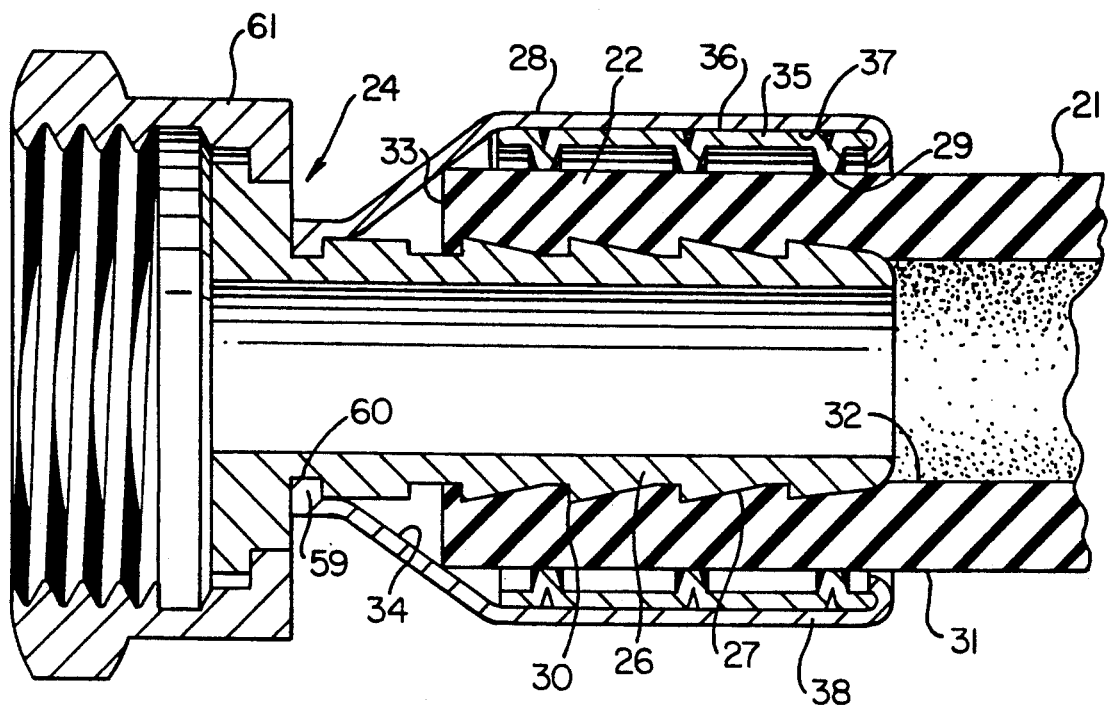
FIG. 3 is a view similar to FIG. 2 and illustrates the end of the hose being initially inserted into the end of the new hose coupling of this invention.

In particular, the recess 23 in the hose coupling 24 is normally of a size to permit the end 22 of the hose 21 to be initially inserted therein in the manner illustrated in FIGS. 2 and 3 so that the outer peripheral surface 31 of the end 22 of the hose 21 is spaced from or merely slidably engages the ridges 29 of the ferrule portion 28 as illustrated in FIG. 3 while the internal peripheral surface 32 of the end 22 of the hose 21 slips over the barbs 30 of the insert portion 26 through the angled relation of the barbs 30 to permit an end edge 33 of the end 22 of the hose 21 to abut against an annular sloping portion 34 of the ferrule portion 28 in the manner illustrated in FIG. 3. Thereafter, the inward deforming of the ferrule portion 28 toward the insert portion 26 not only causes the annular ridges 29 of the ferrule portion 28 to dig into the peripheral surface 31 of the end 22 of the hose 21, but also compresses the material of the end 22 of the hose 21 firmly against the outer peripheral surface 27 of the insert 26 to firmly embed the barbs 30 into the internal peripheral surface 32 of the end 22 of the hose 21 in the manner illustrated in FIG. 4 so that the hose 21 cannot be readily pulled out of the recess 23 of the coupling 24 for the reasons well known in the art.

However, as previously stated, it was found that when the inwardly directed spaced apart annular ridges on a ferrule portion of a coupling are integral with the outer substantially cylindrical structure thereof as set forth in the aforementioned Foster U.S. Pat. No. 4,653,779, such ferrule structure requires a costly machining operation.

In contrast, the annular ridges 29 of the ferrule portion 28 of the hose coupling 24 of this invention are provided by a separate inner ridged section 35 of the ferrule portion 28 and has an external peripheral surface means 36 disposed in engagement with an internal peripheral surface means 37 of an outer generally cylindrical section 38 of the ferrule portion 28 whereby the cylindrical section 38 of the ferrule portion 28 can be formed of one metallic material and the inner ridged section 35 can be formed of another material, such as a plastic or different metallic material than the outer cylindrical section 38 as will be apparent hereinafter. However, it is to be understood that the materials of the sections 35 and 38 can be the same material as it is merely necessary that the ridges 28 of the inner section 35 perform their digging in function for holding the end 22 of the hose 21 in the recess 23 in the manner previously set forth.

Figure 8:
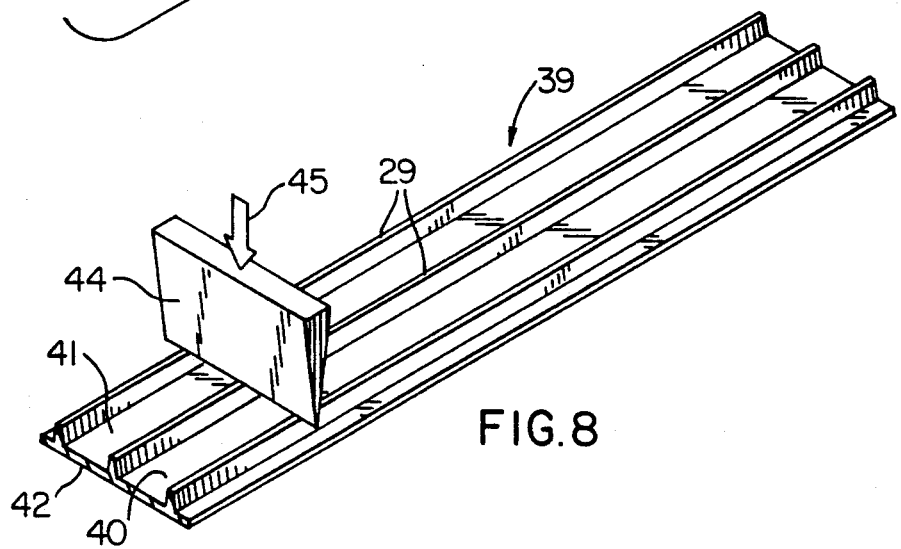
FIG. 8 is a perspective view schematically illustrating how the inner section of the various hose couplings of this invention can be formed from extruded, molded or cast material.

It has been further found according to the teachings of this invention that the inner ridged section 35 of the hose coupling 24 of this invention can be formed from a metallic extrusion, such as the metallic extrusion that is generally indicated by the reference numeral 39 in FIG. 8 and comprising a substantially flat and straight portion 40 having opposed flat parallel sides 41 and 42 with the ridges 29 extending integrally from the surface 41 thereof in spaced apart parallel relation as illustrated in FIG. 8. Such extrusion 39 can comprise a metallic extrusion that is adapted to be cut into individual pieces such as the piece or member 43 of FIG. 9 by a suitable cutting member 44 being forced toward the extrusion 39 in the direction of the arrow 45 in a manner well known in the art.

Figure 5:
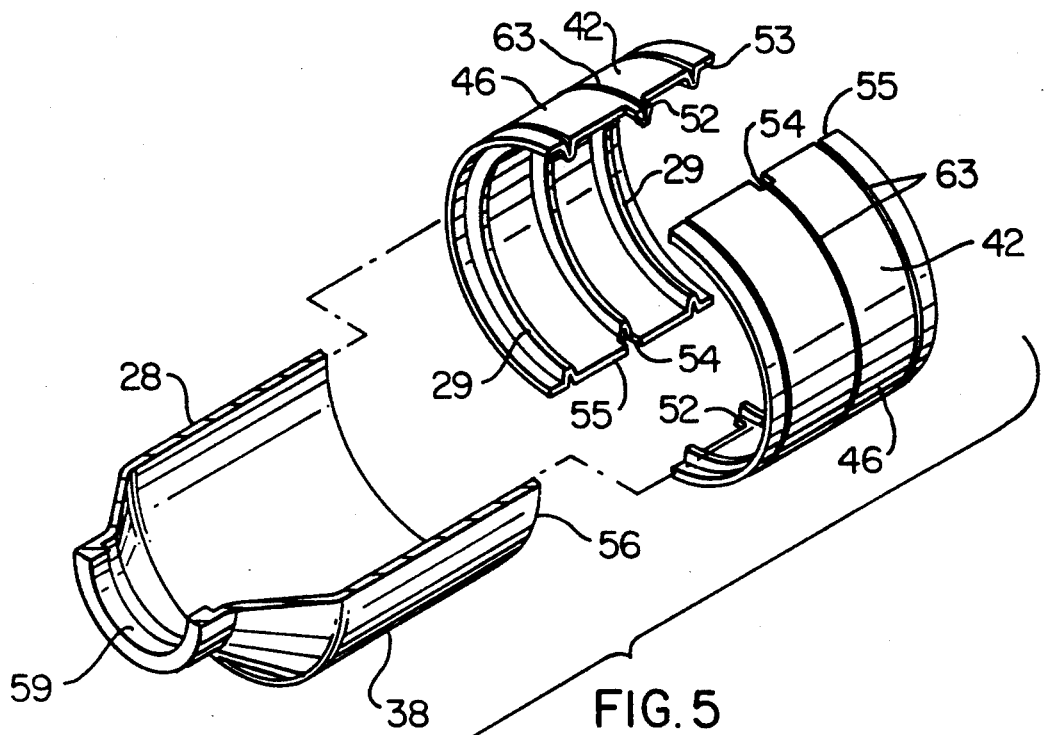
FIG. 5 is a fragmentary exploded perspective view illustrating the parts of the ferrule portion of the hose coupling of FIGS. 1-4.
Figure 9:
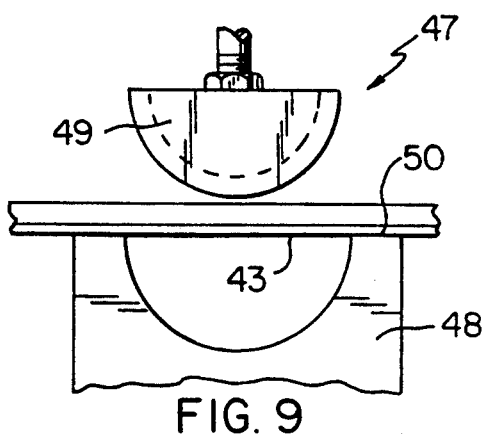
FIG. 9 is a schematic side view illustrating the die means of an apparatus of this invention for forming a strip of material into one of the members of the inner ridged section of the new hose coupling of this invention, FIG. 9 illustrating the die means in an open condition thereof.
Figure 10:
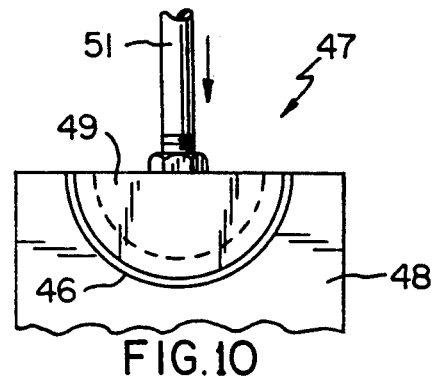
FIG. 10 is a view similar to FIG. 9 and illustrates the die means in the closed position thereof.

Such cut members 43 can thereafter be formed into semi-circular parts or members 46 as illustrated in FIG. 5 by an apparatus of this invention that is generally indicated by the reference numeral 47 in FIGS. 9 and 10 and comprising a female die member 48 and a male die member 49 suitably formed so that the flat member 43 that is disposed on the surface 50 of the lower die member 48 will be deformed into the semicircular configuration as illustrated in FIGS. 10 and 5 by the die member 49 being forced toward the die member 48 by a suitable ram means 51 in a manner well known in the die forming art.

Figure 11:
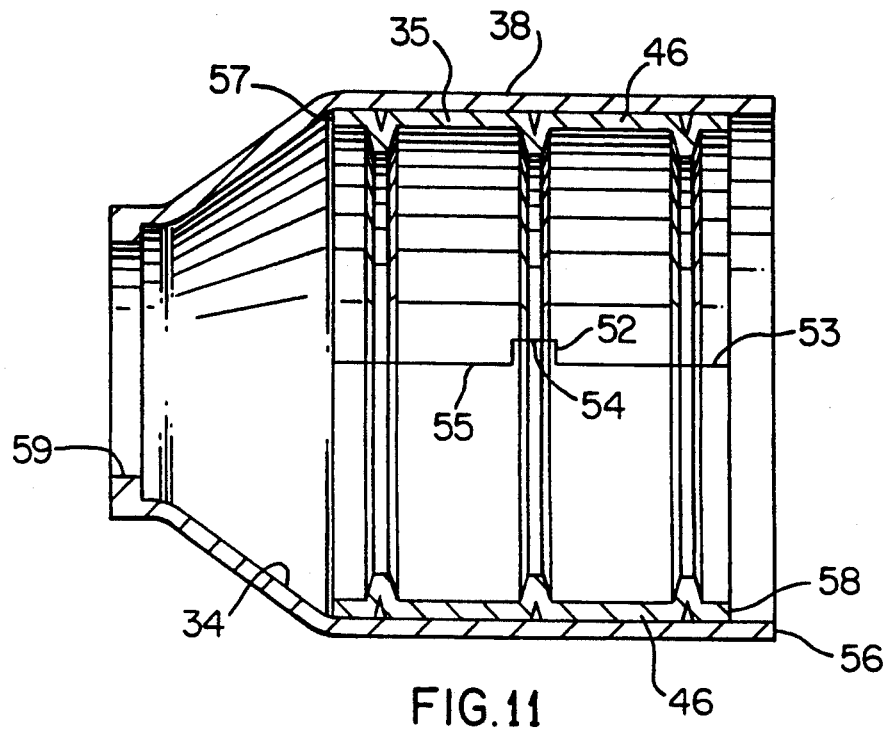
FIG. 11 is a cross-sectional view illustrating how the two like members of FIG. 5 are inserted into the outer cylindrical section of the ferrule portion of the hose coupling of this invention.

Such semicircular members 46 have a like configuration and during the cutting operation of FIG. 8 can have a tongue portion 52 extending centrally outwardly from one edge means 53 thereof that will mate into a cooperating groove means 54 formed in the other edge means 55 so that when the two like parts 46 are disposed together with the edge means 53 and 55 abutting each other, the tongue and groove arrangement 52, 54 will hold the parts 46 together to form the substantially cylindrical section 35 that can be inserted into the open end 56 of the ferrule section 38 in the manner illustrated in FIG. 11 so that one opposed end means 57 of the inner section 35 can abut against the angled end portion 34 of the outer section 38 while the other opposed end means 58 of the inner section 35 is disposed inboard of the outer open end 56 of the outer section 38 as illustrated in FIG. 11. Thereafter, a suitable tool, such as a turning, punching or rolling tool (not shown), can be utilized to turn or upset at least a portion of the edge 56 of the outer section 38 over or against the end means 58 of the inner section 35 as illustrated in FIG. 12 to clamp against the end means 58 thereof and thereby hold the inner section 35 within the outer section 38 by the end means 34 and 56 thereof in a self-contained manner.

Figure 12:
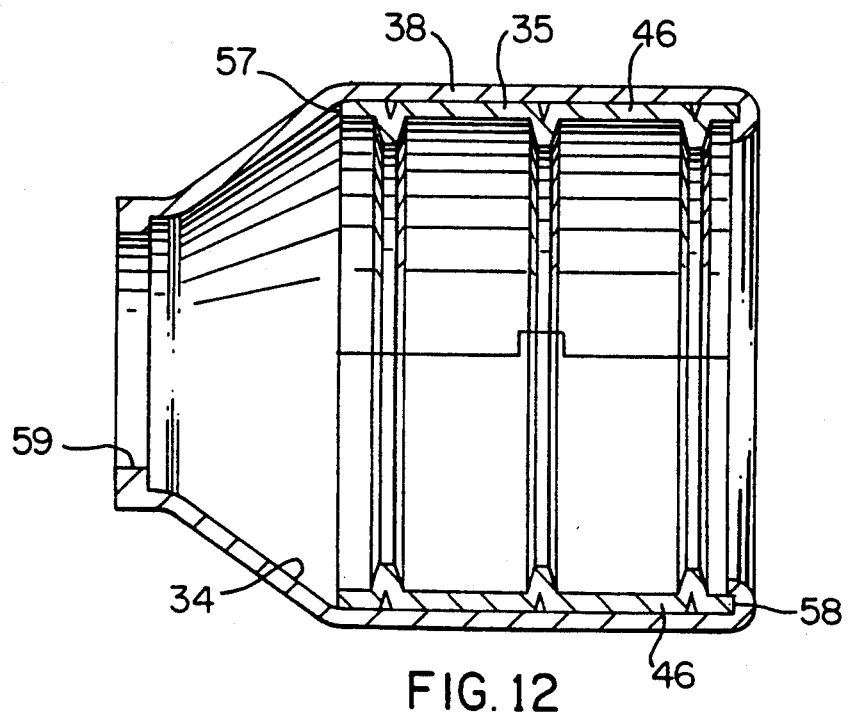
FIG. 12 is a view similar to FIG. 11 and illustrates how the outer cylindrical section is deformed to hold the inner ridged section therein in a self-contained manner.

Thereafter, the insert portion 26 can be inserted into the ferrule portion 28 of FIG. 12 so that an annular end flange portion 59 of the ferrule portion 28 can be deformed down into an annular groove 60 of the insert portion 26 to securely fasten the ferrule portion 28 to the insert portion 26 in a manner well known in the art and fully disclosed in the aforementioned Foster U.S. Pat. No. 4,653,779.

If desired, a suitable rotatable coupling nut 61 can be carried by the insert portion 26 in a manner well known in the art so as to couple the coupling 24 to an externally threaded tubular member that will be threaded into the internally threaded means 62 of the nut 61 in a manner well known in the art.

In this manner, it can be seen that the outer section 38 of the ferrule portion 28 of the hose coupling 24 of this invention not only encapsulates the inner ridged section 35 within the outer section 38 so as to be self-contained therewith as fully illustrated in FIGS. 2 and 12, but also the outer section 38 attaches to the insert 26 to transfer the axial loading to the coupling termination, the outer section 38 being fabricated from any suitable material which can be deformed to attach the ferrule portion 28 to the insert 26 and the subsequent hose coupling 24 to the end 22 of the hose 21 in the manner previously set forth while the inner ridged section 35 can be formed of any suitable material that can survive the deforming of the ferrule portion 28 from its open condition of FIG. 2 to its clamping position of FIG. 4 and still have the rigidity required to deform the ridges 29 into the hose 21.

In this manner, the resulting hose coupling 24 of this invention has a reduced cost over the integral ferrule portion of the hose coupling of the aforementioned Foster U.S. Pat. No. 4,653,779, because the ridged inner section 35 can be formed by a simple extruding, molding or casting operation whereas the ridges of the integral ferrule portion requires an expensive machining operation.

In addition, it can be seen that by providing the inner ridged section 35 separate from the outer cylindrical section 38, the contour shape of the ridges 29 and/or the material of the inner section 35 can be easily varied for different hose clamping applications.

Figure 6:
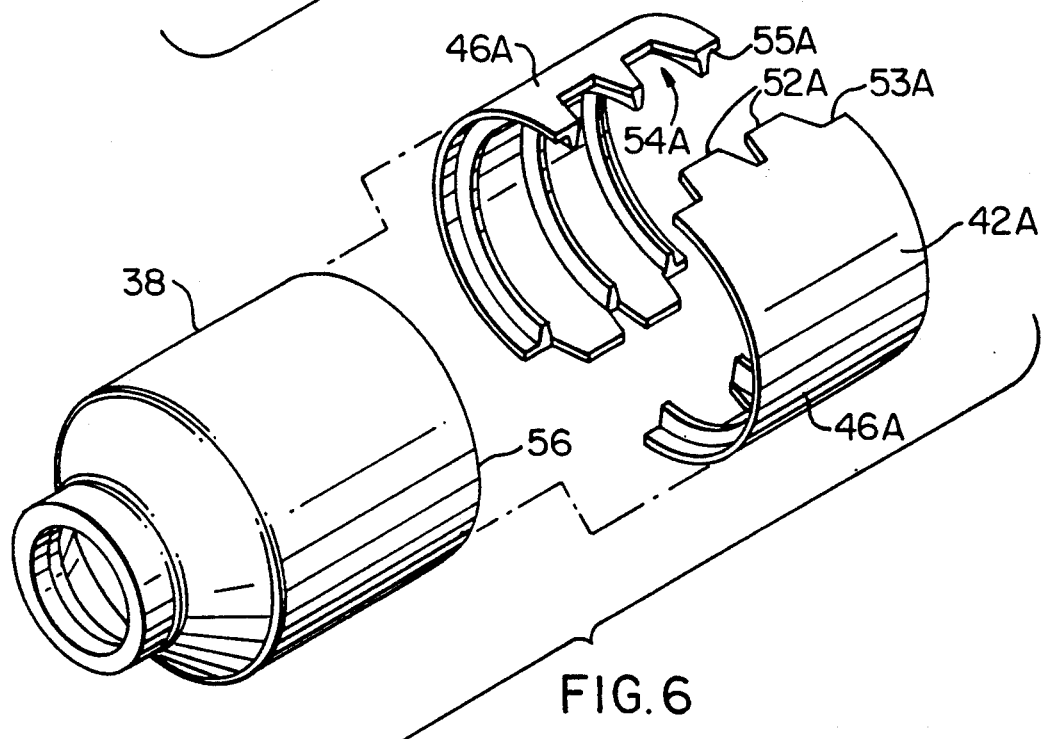
FIG. 6 is a view similar to FIG. 5 and illustrates another ferrule portion of the hose coupling of this invention wherein the inner ridged section of the hose coupling is formed from two like one-piece members that are different from the two like one-piece members of FIG. 5.

For example, it can be seen in FIG. 6 that the outer cylindrical portion 38 can accept two like sections 46A that respectively have a plurality of spaced apart tongues 52A formed on one edge means 53A thereof to be respectively received in a plurality of cooperating groove means 54A formed in the other edge means 55A of the other section 46A whereby the resulting inner section for the outer section 38 will be held in the outer section 38 by the aforementioned turning over operation of the outer edge means 56 of the outer section 38 in the manner previously set forth. In addition, the outer peripheral surface 42A of the members 46A can be completely smooth whereas the outer peripheral surfaces 42 of the members 46 can have annular forming groove means 63 extruded therein during the extruding operation, such annular grooves 63 being illustrated in FIGS. 2, 3, 4, 5, 11 and 12.

Also, while the inner ridged section 35 of the coupling 24 of this invention has been previously described as being formed of two like members, it is to be understood that the same can be formed from more than two like members or can be formed from a single member, if desired.

Figure 7:
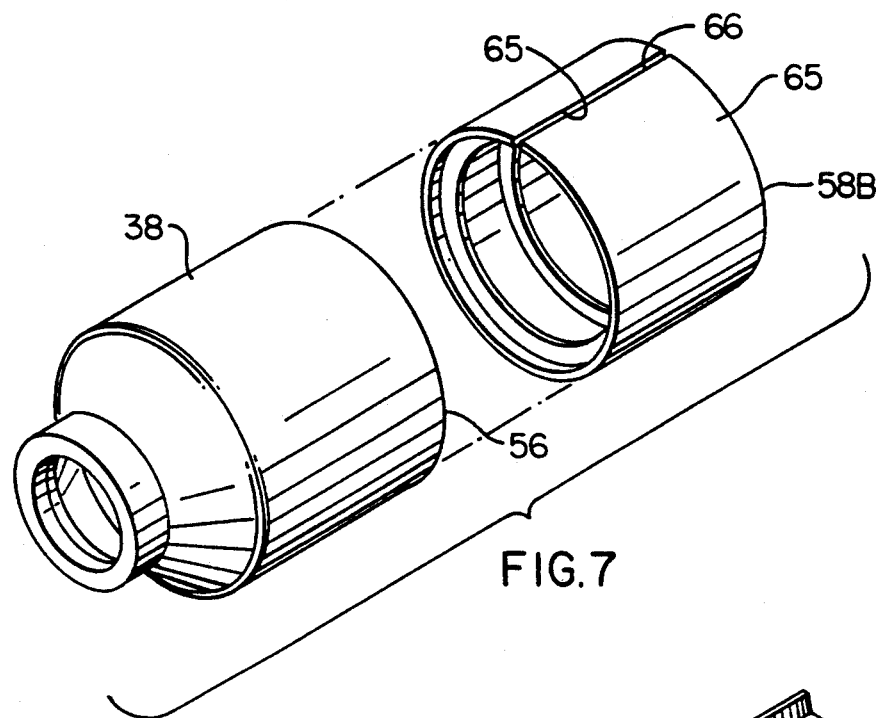
FIG. 7 is a view similar to FIG. 5 and illustrates another ferrule portion of the hose coupling of this invention wherein the inner ridged section is formed from a single member.

For example, reference is now made to FIG. 7 wherein a single insert member 64 has been formed from a large single cut member from the extrusion 39 so that the opposed side edges 65 and 66 thereof are disposed closely adjacent or in engagement with each other when that cut member is curled in any suitable manner into a cylindrical configuration as illustrated in FIG. 7 so as to be fully inserted into the outer cylindrical section 38 as illustrated in FIG. 7 to be completely trapped in the member 38 by having the outer edge means 56 thereof turned over the end means 58B in the manner previously described to provide a self-contained hose coupling in the manner previously set forth.

Therefore, it can be seen that it is a relatively simple method of this invention to form the hose coupling 24 of this invention by forming the ferrule portion 28 from an outer cylindrical portion 38 and an inner ridged section 35, whether the inner ridged section is formed from one or a plurality of parts, the end 56 of the outer section 38 being turned over against a cooperating edge means 58 of the inner section 35 to provide a self-contained ferrule structure 28 than can be fastened to the insert 26 by the annular flange 59 and cooperating annular groove 60 so as to permit the resulting hose coupling 24 to receive an end 22 of a hose 21 in the recess 23 thereof to be clamped therein by an inwardly deforming of the ferrule portion 28 toward the insert 26 in the manner illustrated in FIGS. 2-4 for securing the end 22 of the hose 21 in the recess 23 of the coupling 24 for the reasons well known in the art, such as set forth in the aforementioned Foster U.S. Pat. No. 4,653,779, and the aforementioned Lusher U.S. Pat. No. 2,314,000, and the Jones U.S. Pat. No. 4,212,487, whereby these last two U.S. patents are also being incorporated into this disclosure by this reference thereto.

Therefore, it can be seen that this invention not only provides a new hose coupling and a new combination of such a hose coupling and a hose, but also provides new methods of making such a hose coupling and such a new combination.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose coupling adapted to be attached to an end of a tubular hose, said coupling having a longitudinal axis and comprising a tubular insert portion adapted to be inserted into said one end of said hose and having an external peripheral surface that is substantially parallel to said longitudinal axis, and a tubular ferrule portion disposed in substantially concentric and spaced relation about said insert portion to define an annular recess therebetween and being adapted to be radially inwardly deformed toward said longitudinal axis to clamp said end of said hose between said ferrule portion and said insert portion after said end of said hose has been received in said annular recess, said ferrule portion having a plurality of inwardly directed and axially spaced apart annular ridges for deforming into said end of said hose when said ferrule portion is radially inwardly deformed, said tubular ferrule portion comprising an outer generally cylindrical section having an inner peripheral surface means provided with opposed end means and a separate inner rigid section held within said outer section by said end means thereof to define a self-contained ferrule portion and having an outer peripheral surface means disposed in engagement with said inner peripheral surface means of said outer section and having an inner peripheral surface means defining said ridges of said ferrule portion, said outer section having one of said end means thereof secured to said tubular insert portion and the other of said end means being an open end means, said inner section having opposed end means respectively adjacent said end means of said outer section, the improvement comprising the step of after disposing said inner section in said outer section then turning said open end means of said outer section inwardly around the adjacent end means of said inner section to be substantially parallel with said inner peripheral surface means of said outer section and to engage against said inner peripheral surface means of said inner section so as to old said inner section in said outer section.

2. A method as set forth in claim 1 and comprising the step of forming said inner section from extruded metallic material.

3. A method as set forth in claim 1 and comprising the step of forming said inner section to comprise a one-piece member disposed in a generally cylindrical configuration.

4. A method as set forth in claim 1 and comprising the step of forming said inner section to comprise two like one-piece members shaped to define generally cylindrical configuration when disposed in said outer section.

5. A method as set forth in claim 4 and comprising the step of forming said two like one-piece members to have intermeshing parts when said two like one-piece members are disposed in said outer section.

6. A method as set forth in claim 5 and comprising the step of forming said intermeshing parts to comprise tongue and groove means.

7. A method as set forth in claim 1 and comprising the step of forming said inner section to comprise a metallic extrusion means that has been bent into a generally cylindrical configuration before being disposed in said outer section.

8. A method as set forth in claim 1 and comprising the step of forming said inner section to comprise two like metallic extrusion means that have been bent so as to define a generally cylindrical configuration when disposed in said outer section.

9. A method as set forth in claim 1 wherein said outer section is formed from metallic material and wherein said inner section is formed from a different metallic material.

* * * * *